United States Patent [19]

Engl

[11] 4,353,389

[45] Oct. 12, 1982

[54] HOT GAS VALVE

[75] Inventor: Ernst Engl, Munich, Fed. Rep. of Germany

[73] Assignee: Messerschmitt-Bölkow-Blohm G.m.b.H., Fed. Rep. of Germany

[21] Appl. No.: 197,120

[22] Filed: Oct. 15, 1980

[30] Foreign Application Priority Data

Oct. 31, 1979 [DE] Fed. Rep. of Germany ....... 2943891

[51] Int. Cl.³ ............................................. F16K 31/44
[52] U.S. Cl. .................................. 137/375; 251/249.5; 74/99 A
[58] Field of Search ................ 137/375; 251/248, 252, 251/133, 249.5; 74/99 R, 99 A

[56] References Cited

U.S. PATENT DOCUMENTS

| 2,431,398 | 11/1947 | Hasbrouck | 251/248 |
| 2,769,608 | 11/1956 | Reinig | 251/249.5 |
| 2,998,805 | 9/1961 | Usab | 74/99 A X |
| 4,079,747 | 3/1978 | Roberts | 137/375 |
| 4,082,247 | 4/1978 | Dalton | 251/248 X |

Primary Examiner—A. Michael Chambers
Attorney, Agent, or Firm—McGlew and Tuttle

[57] ABSTRACT

A valve arrangement for varying a cross-sectional flow area of hot gases, particularly the fuel-rich gases of a ramjet engine, comprising, a housing, a valve seat defining an intake opening for the hot gases in the housing, a conduit in the housing connected to the valve seat for supplying hot gases to the intake opening and a valve body which is slidably mounted in the housing and movable toward and away from the valve seat to vary the flow area of the hot gases. The valve body is driven by a worm mechanism having at least one spur gear directly connected to the valve body through pins which extend through inclined or helical slots in the valve body so that, rotation of the gear causes rotation and linear movement of the valve body.

9 Claims, 2 Drawing Figures

HOT GAS VALVE

FIELD AND BACKGROUND OF THE INVENTION

The present invention relates in general to hot gas valves and in particular to a new and useful arrangement and drive of a valve for varying the cross-sectional area of flow of hot gases, particularly fuel-rich gases flowing into the combustion chamber of ramjet engines, with the closing or opening motion being imparted to the valve body by a drive motor through a spur gearing and a worm drive.

There is known from German Pat. No. 710 292 a quick acting valve controlling the amount of water flowing into turbine units. Such a valve drive controlling the motion and quick closure action comprises an electric motor, a worm driven by the motor through a spur gearing, a worm wheel meshing with the worm, and a pawl by which the worm wheel is locked. The opening and closing movements of the valve are effected through an actuating rod which is fixed to the worm and biased by a compression spring in the closing direction of the valve. The worm moves in its axial direction due to its rotation and mesh with the arrested worm wheel. To close the valve quickly, the pawl is disengaged and the compression spring brings the valve into the closed position.

This prior art mechanism for actuating the valve is expensive and susceptible to malfunction.

SUMMARY OF THE INVENTION

The present invention is directed not only to a mechanically simple and reliably operating construction of a valve drive, but also to a compact construction, primarily because the valve to be actuated is exposed to the damaging action of very hot gases.

To this end and in accordance with the invention, it is provided that a valve having the features as set forth above is coupled to, and driven by, the last gear of the spur gear system directly, through a worm drive.

To embody the invention, the last spur gear of the gearing is designed with spokes extending radially from the outside inwardly and engaging individual helical or inclined slots which are provided in, and distributed over the circumference of a valve bearing which is fixed relative to the housing of the engine.

In a development of the invention, the radially inwardly extending spokes of the last spur gear are firmly connected to a sleeve of steel or a similar material, in which the valve body, made of a high temperature resistant material, such as ceramic or sintered material, graphite, etc., is inserted and fixed.

According to another feature of the invention, the inner space of the drive mechanism is gas-tightly closed to the outside at a location between the first spur gear and the drive motor, i.e. in a zone of the engine housing which is relatively remote from the passageways for the hot gases and thus cooler.

To improve the thermal insulation of the engine housing, the inner space accommodating the drive may be filled with a fluid that withstands high thermal loads, especially silicone oil.

The inventive solution meets the particular requirements as stated above and provides a compact valve drive construction reliable in operation in spite of the given extreme thermal conditions.

Accordingly, an object of the present invention is to provide a valve arrangement for varying a cross-sectional flow area of hot gases comprising, a housing, a valve seat defining an intake opening for hot gases in the housing, means defining a hot gases supply conduit for supplying hot gases to the intake opening, a valve body slidably mounted in the housing having a face movable toward and away from the valve seat for varying the cross-sectional flow area of the hot gases into the intake opening, and worm drive means having at least one spur gear directly connected to the valve body operable to move the valve body toward and away from the valve seat.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENT

Figure 1:
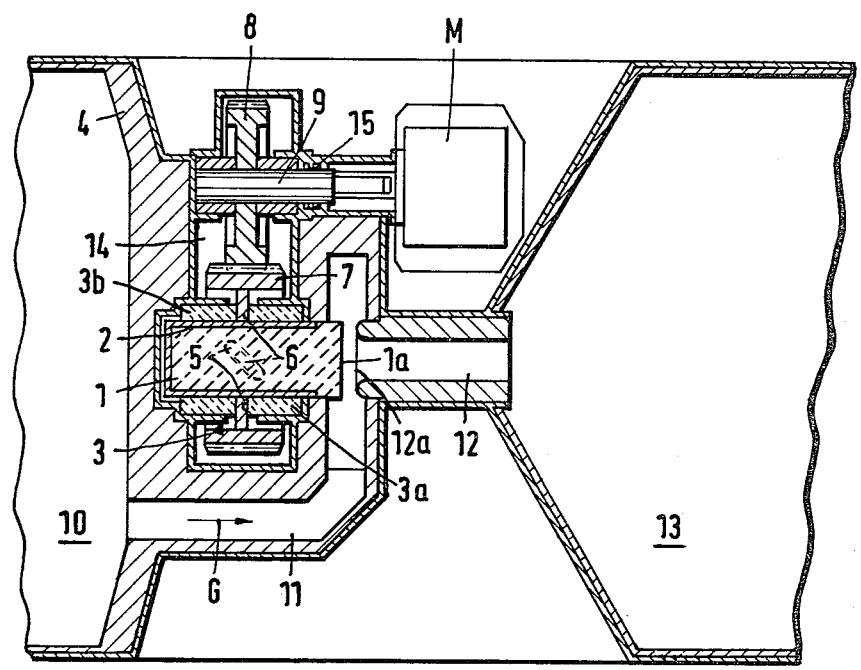
FIG. 1 is a longitudinal sectional view of valve arrangement for a ramjet constructed in accordance with the invention.
Figure 2:
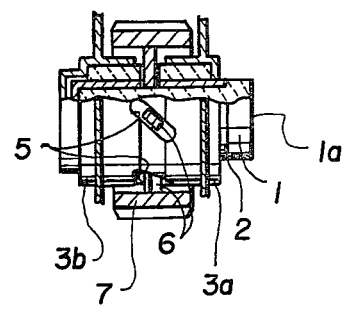
FIG. 2 is a fragmentary elevational view, partially in section, of the valve body and associated bearing structure of the valve arrangement.

Turning to the drawings in particular, the invention embodied therein comprises a valve arrangement for regulating the flow of hot gases, particularly a valve arrangement in a ramjet for varying the flow of hot fuel containing gases having an engine housing 4 which defines a precombustion chamber 10 which supplies fuel-rich gases G through a conduit 11 through a valve and to a combustion chamber 13. The valve includes a valve body 1 which is slidably mounted in the housing to and movable toward and away from the valve seat.

The valve body 1 made of a high-temperature resistant material, such as a ceramic or sintered material or graphite, is firmly fitted in a steel sleeve 2 so that both parts 1 and 2 form a unit, with sleeve 2 (along with valve body 1) that is slidably received in a bearing 3 of high-temperature resistant material, for example, graphite, for rotary motion and longitudinal displacement. Bearing 3 is firmly secured to the engine housing 4 and made in two parts, a front part 3a and rear part 3b, considered in the axial direction. In the area of the parting plane between the two parts 3a and 3b, a plurality of, particularly four, helically extending or inclined grooves or slots 5 are provided in which radially, i.e., from the outside inwardly, extending spokes 6 of a spur gear 7 are engaged. The radially inner ends of spokes 6 are firmly secured to sleeve 2. Spur gear 7 is meshed with a spur gear 8 which is driven by a motor M through a shaft 9.

The fuel-rich gases G produced in a precombustion chamber 10 in known fashion, flow through passages 11 and a central nozzle 12 into the combustion chamber proper 13, where air as an oxygen carrier is added so that the fuel-rich gases G can burn out. The flow of the fuel-rich gases G into central nozzle 12, or the intake cross-section area 12a thereof, are controlled by the front face 1a of valve body 1. The intake area 12a acts as a valve seat for the valve arrangement.

Valve body 1 can be axially displaced so that the intake cross-sectional area and the amount of hot gases G passing into central nozzle 12 are varied, by means of worm drive 5,6, i.e. by turning spur gear 7. Spur gear 7 meshes with and is driven by spur gear 8, so that during its rotary motion, gear 7 slides in the axial direction, or performs an axial motion relative to gear 8. As valve body 1 is displaced axially, it is at the same time turned about its longitudinal axis, along with spur gear 7, because spokes 6 are firmly secured to sleeve 2. During this motion, spokes 6 slide in helical slots 5.

Since a penetration of a small part of the hot gases G into the inner space 14 accommodating the drive could hardly be prevented, a gasket 15 sealing this space is provided at a relatively cooler location. To protect the drive against the heat, inner space 14 may be filled with a fluid that withstands high thermal loads, more particularly with silicone oil.

While a specific embodiment of the invention has been shown and described in detail to illustrate the application of the principles of the invention, it will be understood that the invention may be embodied otherwise without departing from such principles.

What is claimed is:

1. A valve arrangement for varying the cross-sectional flow area of a passage for conducting hot gases, particularly fuel rich gases flowing into the combustion chamber of a ramjet engine, comprising:
    a housing defining said passage;
    a nozzle having an open end communicating with said passage forming a valve seat for receiving the hot gas;
    means in said housing defining a hot gaseous supply conduit for supplying hot gases to said passage;
    a high temperature resistant and insulating bearing in said housing having a plurality of helically extending grooves circumferentially spaced and extending through said bearing;
    a valve body made of high temperature resistant material slidably and rotatably mounted in said bearing, said valve body having a closed face moveable toward and away from said nozzle open end for varying the cross-sectional flow area of said passage;
    a spoke extending through each of said bearing grooves and connected to said valve body;
    a spur gear fixed to an outer end of each of said spokes and circumferentially disposed around said bearing outside said valve body, said spur gear connected to said valve body only through said spoke; and
    drive means engaged with said spur gear for rotating said spur gear to rotate said valve body through said spokes;
    said bearing being fixed with respect to said valve body and spur gear so that rotation of said spur gear causes movement of said spokes in said bearing grooves to axially move said valve body closed face toward and away from said nozzle open end said spur gear moving axially relative to said drive means.

2. A valve arrangement according to claim 1, wherein the valve body comprises a high temperature resistant core made of a material chosen from the group consisting of ceramic, sintered material, and graphite, and a steel sleeve connected to said spokes.

3. A valve arrangement according to claim 1, wherein said housing includes a space defined therein containing said spur gear, said drive means comprising a shaft rotatably mounted in said space, a second spur gear connected to said shaft and engaged with said first-mentioned spur gear and a motor connected to said shaft outside said space.

4. A valve arrangement according to claim 3 including a high temperature resistant fluid filling said space.

5. A valve arrangement according to claim 4, wherein said fluid comprises silicone oil.

6. A valve arrangement according to claim 3, including a gasket seal connected to said housing surrounding and engaged with said shaft at a location spaced from said bearing to seal said space.

7. A valve arrangement according to claim 1, wherein said bearing includes at least a portion engaged with said valve body made of graphite.

8. A valve arrangement according to claim 1, wherein said spokes are evenly circumferentially spaced around said valve body, said valve body being substantially cylindrical said spokes being small in circumferential width with respect to the circumference of said cylindrical body.

9. A valve arrangement according to claim 8, wherein said cylindrical valve body comprises an outer sleeve of steel connected directly to inner radial ends of each spoke and an inner core of heat-resistant material filling said sleeve, said heat-resistant material carrying said closed face.

* * * * *